United States Patent [19]

Hsu

[11] Patent Number: 5,511,758
[45] Date of Patent: Apr. 30, 1996

[54] FOLDING STAND FOR NOTEBOOK COMPUTERS

[76] Inventor: Wan-Sheng Hsu, No. 62, Lane 35, Yu-Shih Rd., Wu-Ku Hsiang, Taipei Hsien, Taiwan

[21] Appl. No.: 378,554

[22] Filed: Jan. 25, 1995

[51] Int. Cl.⁶ .................................................. A47B 97/04
[52] U.S. Cl. ........................................ 248/461; 248/462
[58] Field of Search .................................. 248/447, 448, 248/460, 462, 461, 676, 436

[56] References Cited

U.S. PATENT DOCUMENTS

| | | | |
|---|---|---|---|
| 1,840,620 | 1/1932 | Dennis | 248/462 |
| 2,356,532 | 8/1944 | Rapfogel | 248/462 |
| 3,803,835 | 4/1963 | Coralline | 248/460 |
| 3,822,019 | 7/1974 | Baatz | 211/60 T |
| 5,016,852 | 5/1991 | Herendeen | 248/462 |

*Primary Examiner*—Karen J. Chotkowski
*Assistant Examiner*—Gwendolyn Wrenn
*Attorney, Agent, or Firm*—Bacon & Thomas

[57] ABSTRACT

A folding stand including two parallel supports joined by a folding brace for supporting a notebook computer, wherein the folding brace includes two bracing bars pivotably joined by a link and pivotably connected between the supports; the supports have a respective sloping top wall for supporting the notebook computer in a tilted position for comfortable operation and an elongated bottom opening for receiving one bracing bar when the folding brace is folded up to collapse the stand.

3 Claims, 4 Drawing Sheets

1

FOLDING STAND FOR NOTEBOOK COMPUTERS

BACKGROUND OF THE INVENTION

The present invention relates to computer stands, and relates more particularly to a folding stand for supporting a notebook computer on a desk or the like.

Regular notebook computers are commonly made having a flat bottom shell. When a notebook computer is put on a desk, the flat bottom shell is closely attached to the top surface of the desk. If the top surface of the desk is uneven, the notebook computer will displace during the operation. If the top surface of the desk is wetted or has oil stains, the notebook computer will be contaminated when it is put on the top surface of the desk. Therefore, a clean and flat work table is needed for supporting the notebook computer. Furthermore, because a notebook computer has little space for the dissipation of heat during its operation, directly attaching a notebook computer to the top surface of a desk or the like will affect the heat dissipating efficiency of the notebook computer.

SUMMARY OF THE INVENTION

The present invention has been accomplished under the circumstances in view. It is one object of the present invention to provide a notebook computer stand which holds the notebook computer in the operative position above the desk to facilitate the dissipation of heat during the operation of the notebook computer. It is another object of the present invention to provide a notebook computer stand which prevents direct contact of the notebook computer from the desk. It is still another object of the present invention to provide a notebook computer stand which is collapsible. According to the preferred embodiment of the present invention, two parallel supports are joined by a folding brace for supporting a notebook computer. The folding brace is comprised of bracing bars pivotably connected together by a link. When the folding brace is folded up to collapse the folding stand, the supports are abutted against each other, and the bracing bars are received in a respective bottom opening on each support.

DETAILED DESCRIPTION OF THE PREFERRED EMBODIMENT

Figure 1:
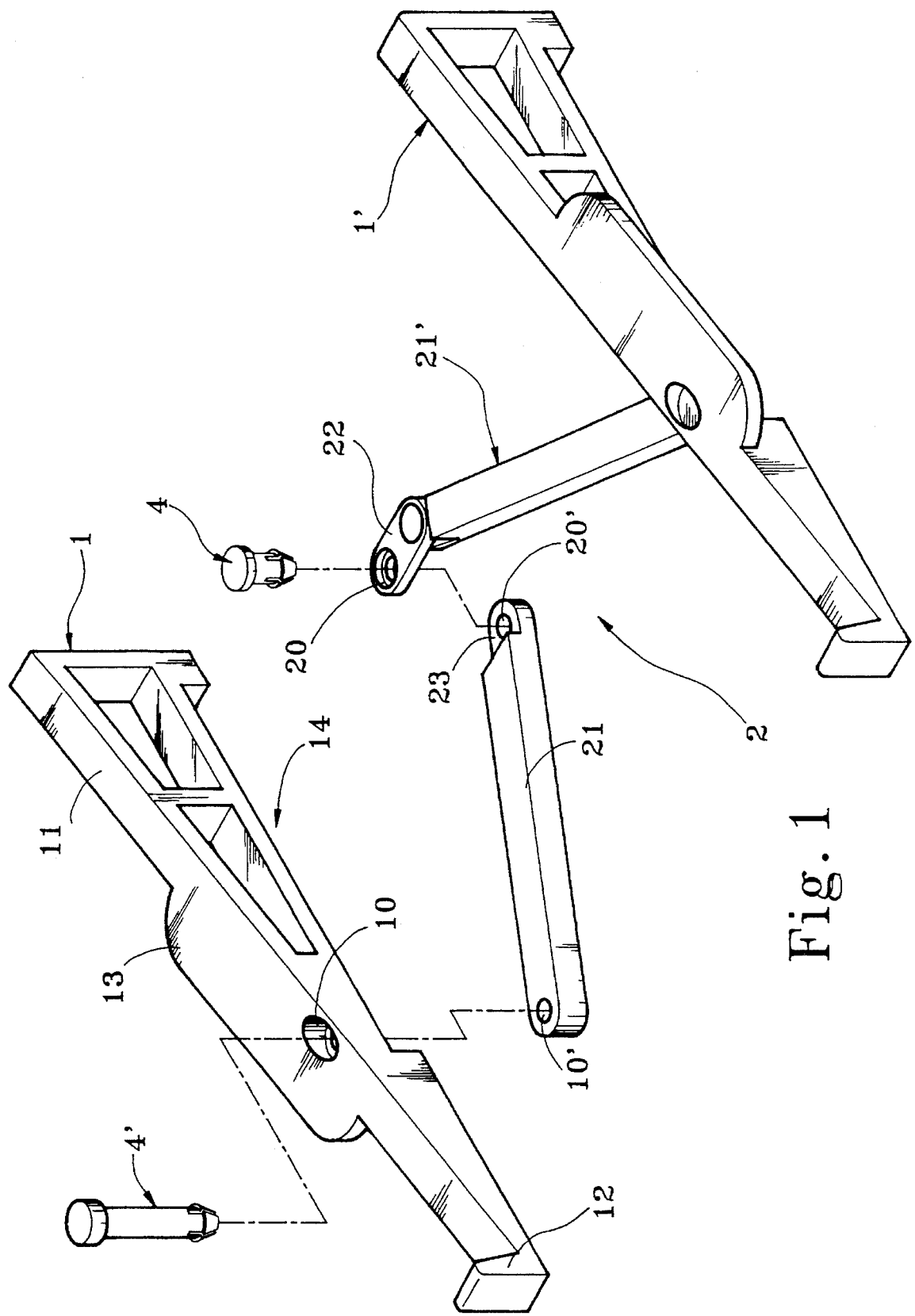
FIG. 1 is an exploded view of a folding stand according to the present invention.
Figure 2:
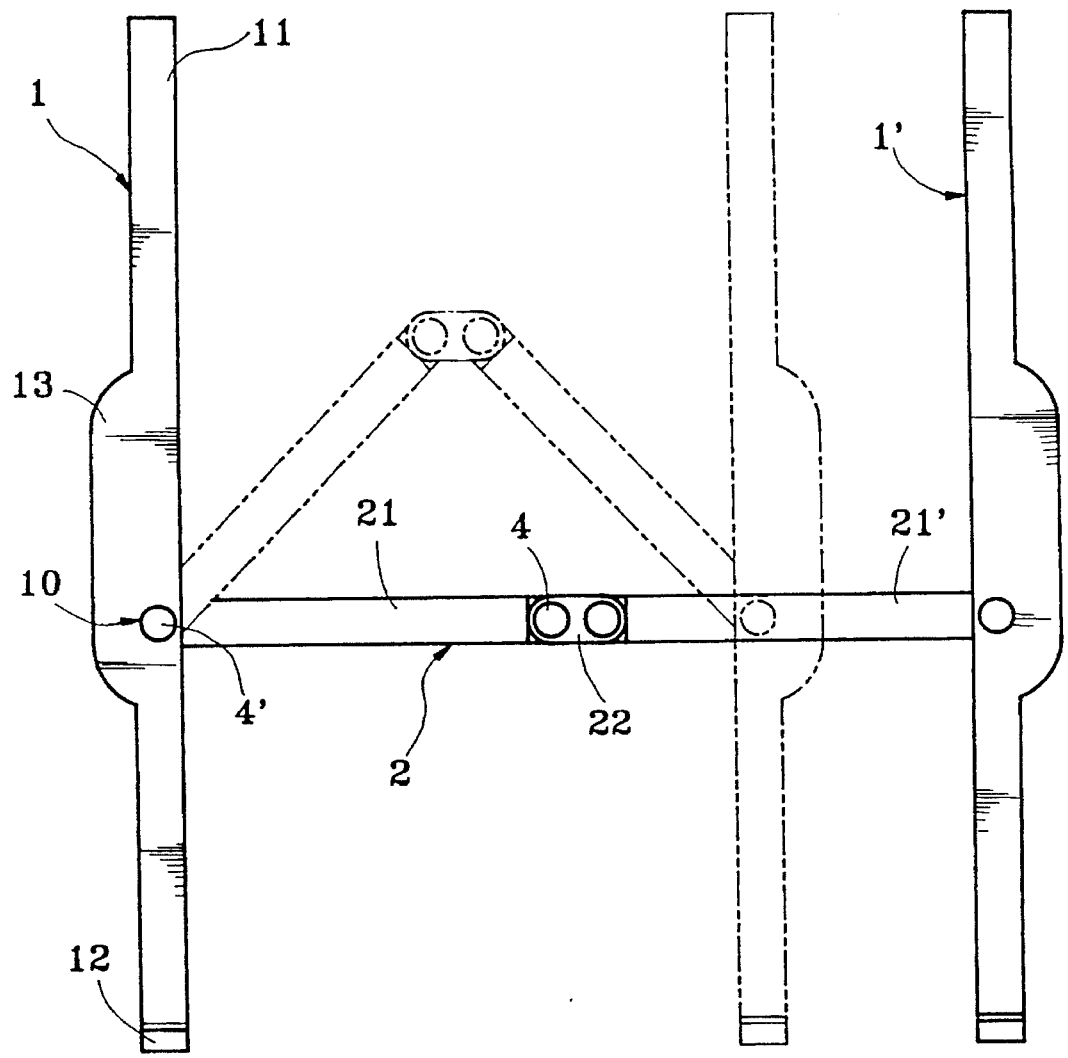
FIG. 2 is a schematic drawing showing the folding stand of the present invention extended out.
Figure 3:
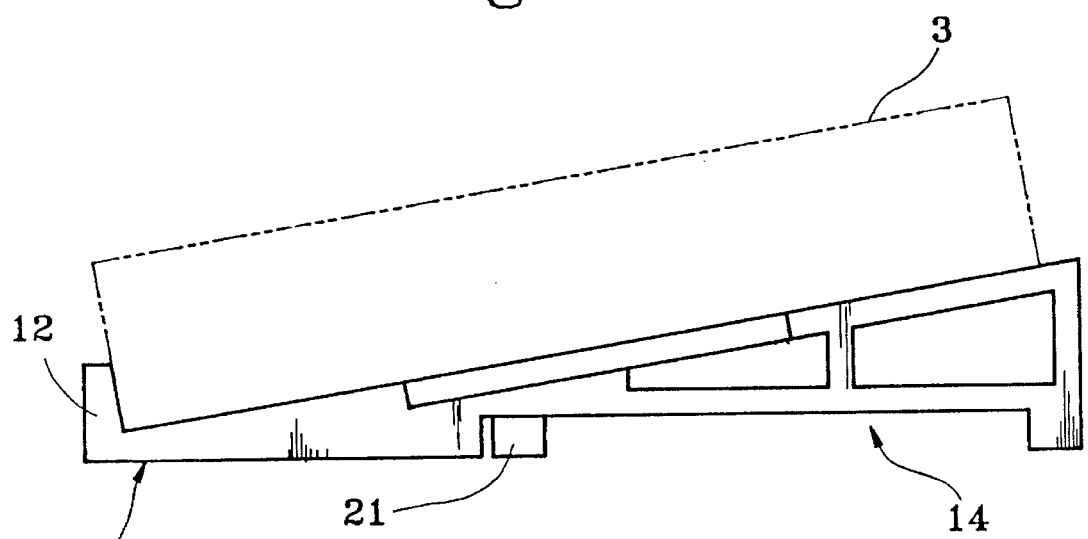
FIG. 3 is a side view of FIG. 2.

Referring to FIGS. 1, 2, and 3, a folding stand in accordance with the present invention is generally comprised of two parallel supports 1 and 1', two bracing bars 21 and 21', and a link 22. The bracing bars 21 and 21' are pivotably connected to two opposite ends of the link 22 to form with the link 22 a folding brace 2 for connection between the parallel supports 1 and 1'. The parallel supports 1 and 1' are symmetrical, each having a sloping top wall 11 for supporting a notebook computer 3 in a tilted position for operation comfortably, awing portion 13 extended outwards from one side of the sloping top wall 11 in a flush manner to increase the supporting area for the notebook computer 3, an upright stop rod 12 upstanding from the lowest end of the sloping top wall 11 for stopping the notebook computer 3 on the sloping top wall 11, a bottom opening 14 for receiving one bracing bar 21, and a countersunk hole 10 through the sloping top wall 11 and in communication with the front end (near the upright stop rod 12) of the bottom opening 14. A locating bolt 4' is inserted through the countersunk hole 10 and a pivot hole 10' at one end of the bracing bar 21 or 21' to connect the bracing bar 21 or 21' to the stand 1 or 1', permitting the bracing bar 21 or 21' to be turned inwards and received within the bottom opening 14 or extended out of the bottom opening 14 into the operative position. The opposite end of the bracing bar 21 or 21 terminates in a lug 23 with a countersunk hole 20' pivotably connected to a countersunk hole 20 at one end of the link 22 by a locating bolt 4.

Figure 6:
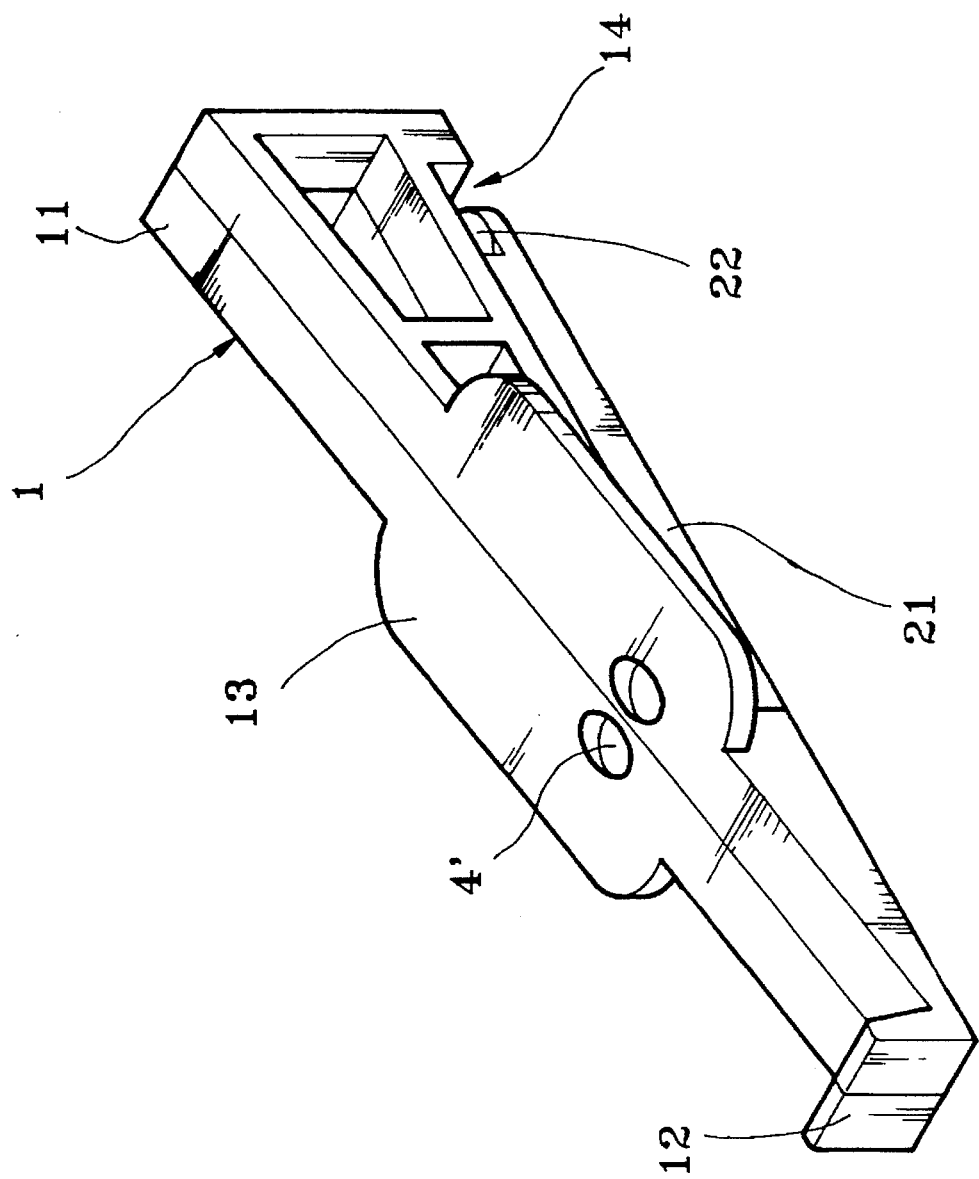
FIG. 6 is an elevational view showing the folding stand of the present invention collapsed.

Referring to FIG. 6 and FIG. 2 again, when assembled, the stand can be turned to the operative position with the folding brace 2 bracing bars 21 and 21' and the link 22 longitudinally aligned between the parallel supports 1 and 1' (see FIG. 2), or turned to the collapsed position with the supports 1 and 1' abutted against each other and the bracing bars 21 and 21' respectively received in the bottom openings 14 of the supports 1 and 1' (see FIG. 6).

Figure 4:
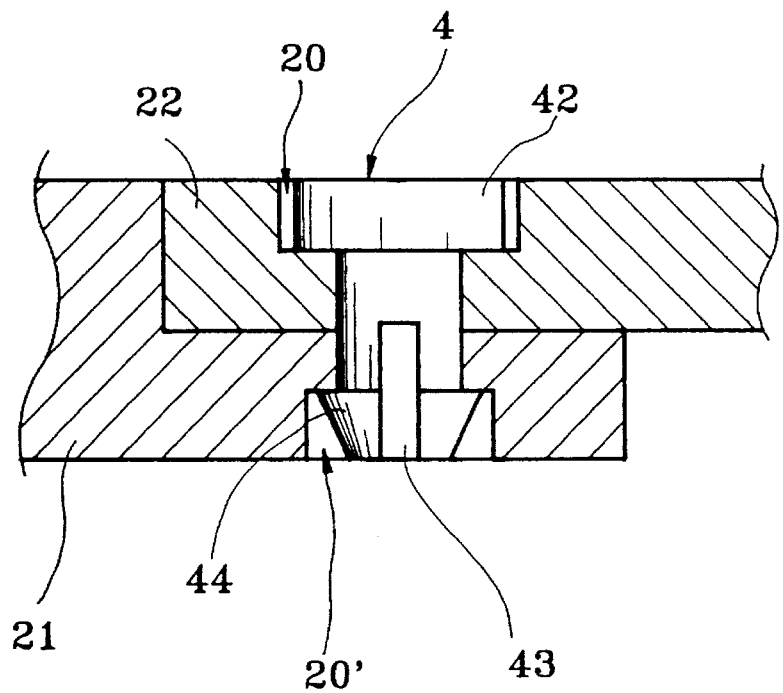
FIG. 4 is a partial view in section in an enlarged scale of the folding stand brace for the folding stand of the present invention.
Figure 5:
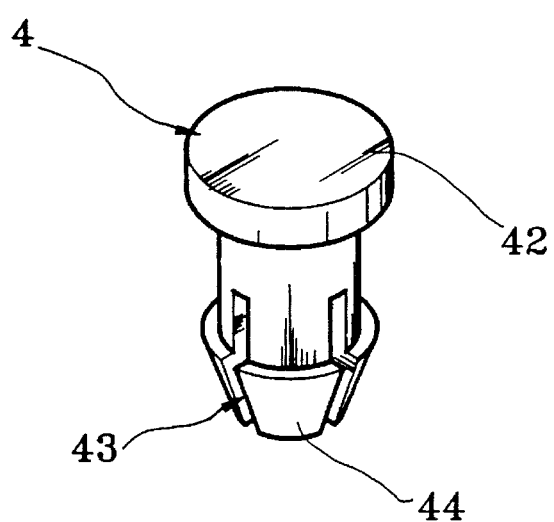
FIG. 5 is an elevational view of a locating bolt according to the present invention.

Referring to FIGS. 4 and 5, the locating bolt 4 has a top end terminating in a head 42, which is received in the countersunk hole 20 at one end of the link 22, and a bottom end terminating in a split cone 44 with crossed splits 43, which is received in the countersunk hole 20' at one end of the bracing bar 21 or 21'. As the bottom end of the locating bolt 4 terminates in a split cone 44, it can be compressed inwards and conveniently inserted through the countersunk holes 20 and 20'. When inserted, the split cone 44 immediately returns to its former shape, causing the locating bolt 4 firmly positioned in the countersunk holes 20 and 20'. The locating bolt 4', which connects the support 1 or 1' and the bracing bar 21 or 21', is identical to the locating bolt 4, which connects the bracing bar 21 or 21' to the link 22.

I claim:

1. A folding stand comprising two parallel supports, each support having a flat top wall for supporting a notebook computer and an elongated bottom opening; and a folding brace connected between said parallel supports and turned between an operative position, in which said parallel supports are spaced from each other, and a non-operative position, in which said parallel supports are abutted against each other, said folding brace comprising two bracing bars and a link, each bracing bar having one end pivotably connected to one end of the bottom opening of one support by a split bolt and an opposite end pivotably connected to one end of said link by a split bolt, said bracing bars being respectively received in the bottom openings of said supports when said folding brace is turned to said non-operative position.

2. The folding stand of claim 1 wherein the flat top wall of each support is a sloping wall having an upright stop rod at the lowest end for stopping the notebook computer in place.

3. The folding stand of claim 1 wherein the flat top wall of each support has a wing portion disposed at least at one side of the flat top wall in a flush manner for supporting the notebook computer.

* * * * *